United States Patent [19]

Hammer et al.

[11] Patent Number: 5,001,212
[45] Date of Patent: Mar. 19, 1991

[54] ADDITIVE FOR HEAT-HARDENABLE EPOXIDE RESIN MASSES

[75] Inventors: Benedikt Hammer, Trostberg; Bernd Graml, Garching, both of Fed. Rep. of Germany

[73] Assignee: SKW Trostberg Aktiengesellschaft, Trostberg, Fed. Rep. of Germany

[21] Appl. No.: 371,449

[22] Filed: Jun. 27, 1989

[30] Foreign Application Priority Data

Jun. 28, 1988 [DE] Fed. Rep. of Germany ........ 3821708

[51] Int. Cl.$^5$ ............................................. C08G 59/68
[52] U.S. Cl. ................................... 528/94; 528/91; 528/361; 528/365; 528/407; 528/408
[58] Field of Search ................... 548/341, 335; 528/94, 528/361, 365, 407, 408

[56] References Cited

U.S. PATENT DOCUMENTS

| | | | |
|---|---|---|---|
| 3,509,166 | 4/1970 | Wright et al. | 548/341 X |
| 3,646,048 | 2/1972 | Wright et al. | 548/341 X |
| 4,269,751 | 5/1981 | Firth | . |
| 4,331,582 | 5/1982 | Babayan | . |
| 4,360,456 | 11/1982 | Firth | . |

FOREIGN PATENT DOCUMENTS

| | | |
|---|---|---|
| 1910758 | 3/1969 | Fed. Rep. of Germany . |
| 1153688 | 2/1968 | United Kingdom . |

OTHER PUBLICATIONS

Chemical Abstracts 102, 214782e (1985).
Chemical Abstracts 102, 105946r (1985).
Chemical Abstracts 102, 55591y (1985).
Chemical Abstracts 100, 167659s (1984).
Chemical Abstracts 99, 32785v (1983).
Tetrahedron Letters 22, 3245–3246 (1981), Ohta et al., "Synthesis of Thiol Esters".
ACS online printout of 1H-Imidazole, 1-(2-hydroxybenzoyl) and Tetrahedron Letters article.
WPIL, File Supplier, Derwent Publications Ltd., London, GB; AN-89-155151 & JP-A-01 96 278.

Primary Examiner—Earl Nielsen
Attorney, Agent, or Firm—Felfe & Lynch

[57] ABSTRACT

The present invention provides an additive for heat-hardenable epoxide resin masses, wherein the additive contains or consists of adducts and/or reaction products of (a) imidazoles of the general formula:

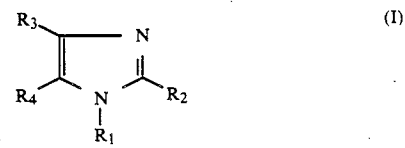

in which $R_1$, $R_2$, $R_3$ and $R_4$, which can be the same or different, are hydrogen atoms, alkyl, alkenyl or alkynyl radicals containing up to 3 carbon atoms or phenyl radicals, said radicals being unsubstituted or substituted, and (b) at least one aromatic hydroxy acid.

The additives according to the present invention can be used alone as hardeners or, in combination with other latent hardeners, as accelerators.

20 Claims, No Drawings

ADDITIVE FOR HEAT-HARDENABLE EPOXIDE RESIN MASSES

FIELD OF THE INVENTION

The present invention is concerned with an additive for heat-hardenable epoxide resin masses which can be used as hardener or, in combination with known hardeners, as accelerator.

BACKGROUND OF THE INVENTION

As is known, for storage-stable epoxide resin mixtures there are used urons, such as monuron, diuron, fenuron and the like, for example in combination with dicyandiamide (cf. U.S. Pat. Nos. 3,562,215 and 3,956,237). A disadvantage in the case of the urons is the laborious production of these products, as well as the fact that, as accelerators, they are not able to lower the hardening temperatures of the epoxide resin masses as much as is desired.

Furthermore, imidazolides (N-acylimidazoles) (cf. Federal Republic of Germany Patent No. 32 46 072), as well as imidazoles blocked with isocyanate, have been described as latent, highly-reactive hardeners. Both types of compounds must be produced very laboriously by reaction with special acid chlorides, with the liberation of hydrogen chloride, or with isocyanates.

Imidazoles can be produced substantially more cost-favorably, for example according to British Patent No. 1,050,679, but they only possess a limited effectiveness or storage stability. Finally, U.S. Pat. No. 3,356,645 discloses special imidazole salts as hardeners which are formed from imidazoles and monocarboxylic acids containing up to 8 carbon atoms, for example acetic acid, lactic acid and the like. These salts are liquid and, in the case of comparatively long storage, change their color (dark coloration, oxidative decomposition).

OBJECTS OF THE INVENTION

Therefore, it is an object of the present invention to provide an additive for heat-hardenable epoxide resin masses which does not display the above-mentioned disadvantages of the prior art, is simple to produce and imparts a good storage stability to an epoxide resin-hardener mixture.

DESCRIPTION OF THE INVENTION

Thus, according to the present invention, there is provided an additive for heat-hardenable epoxide resin masses, wherein it contains or consists of an adduct and/or reaction product of (a) an imidazole of the general formula:

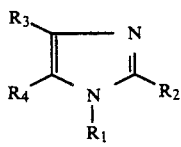

(I)

in which $R_1$, $R_2$, $R_3$ and $R_4$, which can be the same or different, are hydrogen atoms or alkyl, alkenyl or alkynyl radicals containing up to 3 carbon atoms or phenyl radicals and (b) at least one aromatic hydroxy acid.

We have found, surprisingly, that with the help of the additive according to the present invention, the storage stability of epoxide resin-hardener mixtures is decisively prolonged in comparison with known additives.

Furthermore, we have found that the additive according to the present invention brings about a very rapid commencement of the hardening at elevated temperatures, which also could not have been foreseen.

The additive according to the present invention consists of or comprises an adduct and/or reaction product of a particular imidazole derivative and of an aromatic hydroxy acid. In the scope of the present invention, by adduct is to be understood a loosely bound addition product, whereas reaction products are to be regarded as being especially the salts of the particular imidazole derivatives with the appropriate hydroxy acids.

The imidazole derivatives to be used according to the present invention can be unsubstituted or optionally substituted in the 1-, 2-, 4- and/or 5-position. As substituents, there can hereby be used especially alkyl radicals with up to 3 carbon atoms in the main chain, the unsaturated analogoues thereof, as well as phenyl radicals. Examples of appropriate alkyl radicals include methyl, ethyl and n-propyl radicals, examples of unsaturated radicals include vinyl and allyl radicals and an example of a branched radical is the isopropyl radical.

The alkyl radicals, the unsaturated analogues thereof and the phenyl radicals of the substituted imidazoles can, in turn, also be substitued. The substituents for the alkyl radicals and for the unsaturated analogues thereof include cyano and hydroxyl groups, methoxy radicals, as well as phenyl radicals or other aromatic substituents. Examples of such substituted alkyl radicals include 2-cyanoethyl, 2-hydroxyethyl, 2-methoxyethyl, benzyl and 2-(3,5-diamino-s-triazinyl)ethyl radicals.

Phenyl radicals in the 1-, 2-, 4- or 5-position of the imidazole can also be substituted, examples of such substituents including halogen atoms, hydroxy, amino and cyano groups and methoxy radicals.

The imidazoles which can be used for the preparation of the additive according to the present invention are known and some of them are commercially available or can be prepared very easily by conventional processes.

As the second components, the additive according to the present invention contains aromatic hydroxy acids, these being understood to include those aromatic compounds which contain at least one hydroxy and at least one acid function. As aromatic systems, there are thereby preferred the phenyl and naphthyl aromatic compounds and as acid function the carboxylic acid and sulphonic acid function. Examples of such compounds include phenolcarboxylic acids, phenolsulphonic acids, naptholcarboxylic acids and naphtholsulphonic acids. Apart from one or more hydroxyl and acid groups, the aromatic hydroxy acids can also carry further substituents, halogen atoms, nitro and amino groups, methoxy, ethoxy and alkyl containing up to 3 carbon atoms being preferred. The $C_1$-$C_3$-alkyl radicals can thereby also be substituted, preferably by a phenyl radical which can optionally contain further substituents, especially hydroxy, carboxylic acid or sulphonic acid groups. These include, for example, dihydroxy aromatic carboxylic acids which are joined together via a methylene radical, for example methylenedisalicylic acid. Because of their ready availability, salicylic acid, gallic acid and p-phenolsulphonic acid are especially preferred.

The mole ratio of components (a) and (b) can be varied within wide limits. The mole ratios of imidazole derivative to acid group of the aromatic hydroxy acid are preferably from 2:1 to 1:2.5 and especially from 1:0.6 to 1:1.2.

The preparation of the additive according to the present invention from components (a) and (b) can take place in various ways, the following variants I, II and III being technically especially simple and economic.

Variant I: intimate mixing of the components in a solid state and possible subsequent grinding;

Variant II: mixing the components, heating up to melting and possible comminution after cooling; and Variant III: dissolving the components in an appropriate solvent, for example water, an alcohol (such as methanol or ethanol), dimethylformamide, a ketone or the like, with heating and crystallizing out of the product, for example in the form of a salt, in the cold.

The additive according to the present invention displays advantageous properties as hardener or accelerator for epoxide resin masses. As epoxide resins, there can thereby be used all products which, on average, contain more than one 1,2-epoxide group and can be saturated or unsaturated, aliphatic, cycloaliphatic, aromatic or heterocyclic and can possibly contain substituents, for example halogen atoms, phosphorus atoms and hydroxyl groups.

Especially preferred are epoxide resins based on glycidyl polyethers of 2,2-bis-(4-hydroxyphenyl)-propane (bisphenol A), as well as the bromine-substituted derivative thereof (tetrabromobisphenol A), glycidyl polyethers of 2,2-bis-(4-hydroxyphenyl)-methane (bisphenol F) and glycidyl ethers of novolack resins.

If the additive according to the present invention is used as hardener, then amounts of from 1 to 15% by weight, referred to the weight of the epoxide resin, usually suffice in order to achieve an optimum effect.

The additive according to the present invention can be used not only as a hardener but also as an accelerator in combination with other latent hardeners, the amount of the accelerator preferably being from 0.1 to 1.5% by weight, referred to the weight of the epoxide resin. The latent hardeners which can be combined with the additive according to the present invention (accelerator) are known and some of them are commercially available.

Preferred as combinable latent hardeners are those which contain amino, imino, amido, imido, triazine and/or hydrazide groups. There can be used, for example, boron trichloride/amine and boron trifluoride/amine complexes, dicyandiamide, aminotriazines, such as melamine or diallylmelamine, and guanamines, for example acetoguanamide or benzoguanamine, aminotriazoles, for example 3-amino-1,2,4-triazole, carboxylic acid hydrazides, for example adipic mono- or dihydrazide, stearic hydrazide and isophthalic mono- or dihydrazide, semicarbazide, cyanoacetamide and aromatic polyamines, for example diaminodiphenylsulphone. Dicyandiamide, isophthalic acid dihydrazide and adipic acid dihydrazide are especially preferably used in combination with the additive according to the present invention.

Depending upon the particular case of use, the additive according to the present invention can be mixed with a liquid or molten epoxide resin and suspended therein or introduced in dissolved form into the epoxide resin or into a solution thereof. As solvents, there can, in principle, be used all liquids in which the epoxide resin, the hardener and possible the accelerator dissolve to a sufficient extent. Examples of solvents which can be used include various glycol ethers, for example ethylene glycol and propylene glycol monomethyl ethers, as well as esters thereof but also ketones, for example acetone, or dimethylformamide and the like.

The additive according to the present invention is advantageously used in a form which is as finely divided as possible in order to achieve a uniform distribution and an optimum effect. Therefore, the particle size should preferably be <150 μm.

The epoxide hardening with the help of the additive according to the present invention takes place at temperatures of from 100° to 200° C. and preferably of from 130° to 180° C., a rapid commencement of the hardening thereby taking place. This is a further advantage of the additive according to the present invention, as well as the good storage stability of the epoxide resin-hardener mixtures which contain the additive.

The following Examples are given for the purpose of illustrating the present invention:

EXAMPLE 1.

Preparation of additives according to the present invention.

Additive 1.

82 g. 2-Methylimidazole are intimately mixed with 138 g. salicylic acid and ground with a pin mill (mole ratio of the components 1:1, particle size <80 μm.).

Additive 2.

35 g. 2-Methylimidazole are intimately mixed with 65 g. salicylic acid and the mixture obtained is used unground (mole ratio of the components 1:1.1, particle size <150 μm.).

Additive 3.

350 g. 2-Methylimidazole and 650 g. salicylic acid (mole ratio 1:1.04) are dissolved in 2 liters of water at 45° C. After cooling to 10° C., the precipitated salt is centrifuged off and washed with a little water. The mother liquor is again used as solvent. The product, which crystallizes out from the solvent water after using three times in almost quantitative yield and contains one mole of water of crystallization, is used; particle size <120 μm.

Additive 4.

17.9 g. 2-Methylimidazole are added to 50.0 g. of a 65% by weight solution of p-phenolsulphonic acid in water and stirred. The water present is distilled off in a vacuum and the product obtained is dried over silica gel in a desiccator. The product with a melting point of >48° C. and a particle size of <120 μm. is used.

Additives 5 to 14.

The imidazole or imidazole derivative is dissolved in 100 ml. of water, the aromatic hydroxy acid is added thereto and the mixture is stirred for 1 hour at 60° C. The water is then stripped off in a vacuum and the product (particle size <120 μm.) is dried in a vacuum at 60° C. for about 14 hours. The following Table gives the amounts of starting compounds used:

TABLE

| additive | imidazole derivative | aromatic hydroxy acid | mole ratio |
| --- | --- | --- | --- |
| 5 | 8.85 g. 2-MI | 21.15 g. 4-hydroxy-3-nitrobenzoic acid (98%) | 1:1.05 |
| 6 | 8.39 g. 2-MI | 21.61 g. 5-sulpho-salicylic acid | 1:1.90 |

TABLE-continued

| additive | imidazole derivative | aromatic hydroxy acid | mole ratio |
|---|---|---|---|
|  |  | (98%) |  |
| 7 | 11.10 g. 2-MI | 18.9 g. sulphanilic acid (99%) | 1:0.80 |
| 8 | 5.52 g. 2-MI | 24.38 g. 2-amino-4-sulphobenzoic acid (64%) | 1:2.10 |
| 9 | 8.70 g. 2-MI | 21.3 g. 2-aminophenol-4-sulphonic acid (89%) | 1:0.95 |
| 10 | 10.70 g. 2-MI | 19.3 g. gallic acid hydrate (98%) | 1:0.85 |
| 11 | 14.00 g. 1-MI | 25.9 g. salicylic acid | 1:1.10 |
| 12 | 14.6 g. 1-HEI | 16.2 g. salicylic acid | 1:0.90 |
| 13 | 14.3 g. 2,4-EMI | 13.5 g. gallic acid hydrate (98%) | 1:0.06 |
| 14 | 14.0 g. 2-PHI | 13.5 g. gallic acid hydrate (98%) | 1:0.80 |

2-MI = 2-methylimidazole
1-MI = 1-methylimidazole
1-HEI = 1-(2-hydroxyethyl)-imidazole
2,4-EMI = 2-ethyl-4-methylimidazole
2-PHI = 2-phenylimidazole

EXAMPLE 2.

The storage stability of the additives 1 to 10 according to the present invention of Example 1 is investigated in epoxide resin masses in comparison with additives 15 to 17 according to the prior art:

Additive 15.

2-Methylimidazole (particle size about 80 μm.) (comparison)

Additive 16.

Intimate mixture of 2-methylimidazole and succinic acid (mole ratio 1:1.04, particle size about 80 μm.) (comparison)

Additive 17.

Reaction product of 2-methylimidazole with lactic acid corresponding to U.S. Pat. No. 3,336,645. (mole ratio 1:1.75, liquid) (comparison)

For the determination of the storage stability, in 10 g. of liquid epoxide resin (Epikote 828) are, in each case, dispersed 3% by weight of the additive and stored at 40° C. At intervals of 24 hours, the viscosities are determined at 25° C. (hook rotation viscosimeter RV 2/PK). The results obtained are shown in the following Table:

| additive | viscosity in Pa.s |  |  |  |
|---|---|---|---|---|
|  | 0 d. | 1 d. | 2 d. | 3 d. |
| No. 1 (I) | 12.9 | 25.0 | 40.1 | 84.0 |
| No. 2 (I) | 13.8 | 15.9 | 20.3 | 24.4 |
| No. 3 (I) | 14.5 | 22.9 | 35.5 | 61.7 |
| No. 4 (I) | 13.1 | 14.5 | 17.8 | 21.8 |
| No. 5 (I) | 15.0 | 29.5 | 43.9 | 81.1 |
| No. 6 (I) | 15.0 | 14.8 | 15.5 | 15.8 |
| No. 7 (I) | 14.5 | 19.0 | 23.0 | 30.0 |
| No. 8 (I) | 14.3 | 14.2 | 14.6 | 14.2 |
| No. 9 (I) | 13.0 | 14.7 | 15.5 | 15.5 |
| No. 10 (I) | 14.5 | 15.9 | 21.1 | 31.3 |
| No. 15 (C) | 12.1 | solid | — | — |
| No. 16 (C) | 13.8 | 26.2 | solid | — |

-continued

| additive | viscosity in Pa.s |  |  |  |
|---|---|---|---|---|
|  | 0 d. | 1 d. | 2 d. | 3 d. |
| No. 17 (C) | 12.5 | 72.3 | solid | — |

I = according to the present invention
C = comparison

EXAMPLE 3.

The action of additive No. 1 according to the present invention of Example 1 as accelerator is investigated in comparison with 2-methylimidazole (additive No. 15 of Example 2) as accelerator. For this purpose, an epoxide resin solution (Rütapox 2040 MEK 75) is mixed with 30% by weight of a 10% dicyandiamide solution in methyl glycol and, in each case, 0.1% by weight of additive No. 1 (I) and No. 15 (C) to give a clear solution (% by weight in each case referred to the amount of epoxide resin). These solutions were hardened in thin layers (1 hour at 130° C., 1 hour at 170° C.) and the Tg values of the two hardened resins determined in a DSC apparatus.

The Tg values in the case of the use of additive No. 1 and No. 15 agree within the scope of exactitude (+/−1° C.). As can be seen, the hardening action of the additive according to the present invention is comparable with that of 2-methylimidazole.

We claim:

1. A heat-hardenable epoxide resin composition consisting essentially of an epoxide resin and a hardener, wherein said hardener is an adduct or reaction product of (a) an imidazole of the formula

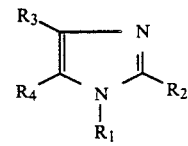

wherein $R_1$, $R_2$, $R_3$ and $R_4$, which may be identical to or different from each other, are hydrogen atoms, acyclic hydrocarbon radicals of one three carbon atoms or phenyl radicals and (b) at least one aromatic hydroxy acid.

2. A composition of claim 1, wherein said acyclic hydrocarbon radicals are unsaturated.

3. A composition of claim 1, wherein said acyclic hydrocarbon or phenyl radicals are substituted.

4. A composition of claim 3, wherein the substituent or substituents of the acyclic hydrocarbon radicals are cyano or hydroxyl groups, methoxy or phenyl radicals or heterocyclic aromatic radicals.

5. A composition of claim 1, wherein said aromatic hydroxy acid is a phenol- or naptholsulfonic acid or phenol- or naptholcarboxylic acid.

6. A composition of claim 1, wherein said aromatic hydroxy acid is substituted by at least one substituent selected from the group consisting of halogen atoms, nitro and amino groups, and methoxy, ethoxy or alkyl radicals of one to three carbon atoms.

7. A composition of claim 5, wherein said phenolcarboxylic acid is salicylic acid.

8. A composition of claim 5, wherein said phenolcarboxylic acid is gallic acid.

9. A composition of claim 5, wherein said phenolsulfonic acid is p-phenolsulfonic acid.

10. A composition of claim 1, wherein the mol ratio of imidazole derivative to acid group of the aromatic hydroxy acid is from 2:1 to 1:2.5.

11. The method of hardening a heat-hardenable epoxide resin, which comprises mixing said epoxide resin with an adduct and/or a reaction product of (a) an imidazole of the formula

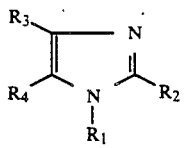

wherein $R_1$, $R_2$, $R_3$ and $R_4$, which may be identical to or different from each other, are hydrogen atoms, acyclic hydrocarbon radicals of one to three carbon atoms or phenyl radicals and (b) at least one aromatic hydroxy acid, and heating the resulting mixture to a temperature of 100° C. to 200° C.

12. The method of claim 11, wherein the acyclic hydrocarbon radicals of the imidazole are unsaturated.

13. The method of claim 11, wherein the acyclic hydrocarbon or phenyl radicals are substituted.

14. The method of claim 13, wherein the substituent or substituents of the acyclic hydrocarbon radicals are cyano or hydroxyl groups, methoxy or phenyl radicals or heterocyclic aromatic radicals.

15. The method of claim 11, wherein the aromatic hydroxy acid is a phenol- or naphtholsulfonic acid or a phenol- or naphtholcarboxylic acid.

16. The method of claim 11, wherein the aromatic hydroxy acid is substituted by a least one substituent selected from the group consisting of halogen atoms, nitro and amino groups and methoxy, ethoxy or alkyl radicals containing up to three carbon atoms.

17. The method of claim 15, wherein said phenolcarboxylic acid is salicyclic acid.

18. The method of claim 15, wherein the phenolcarboxylic acid is gallic acid.

19. The method of claim 15, wherein the phenolsulfonic acid is p-phenolsulfonic acid.

20. The method of claim 11, wherein the mol ratio of imidazole derivative to acid group of the aromatic hydroxy acid is from 2:1 to 1:2.5.

* * * * *

UNITED STATES PATENT AND TRADEMARK OFFICE
CERTIFICATE OF CORRECTION

PATENT NO. : 5,001,212
DATED : March 19, 1991
INVENTOR(S) : Benedikt Hammer et al It is certified that error appears in the above-identified patent and that said Letters Patent is hereby corrected as shown below:

Column 5, line 45, "3,336,645" should read --3,356,645--.

Signed and Sealed this

Twenty-ninth Day of December, 1992

Attest:

DOUGLAS B. COMER

*Attesting Officer*    *Acting Commissioner of Patents and Trademarks*